(12) United States Patent
Vecchi et al.

(10) Patent No.: US 10,602,734 B2
(45) Date of Patent: Mar. 31, 2020

(54) SYSTEM FOR THE DISINFECTION OF AGRICULTURAL SOIL

(71) Applicant: POLITECNICO DI TORINO, Turin (TO) (IT)

(72) Inventors: Giuseppe Vecchi, Leini' (IT); Gianluca Dassano, Almese (IT); Giorgio Giordanengo, Robilante (IT)

(73) Assignee: Politecnico Di Torino, Turin (IT)

( * ) Notice: Subject to any disclaimer, the term of this patent is extended or adjusted under 35 U.S.C. 154(b) by 0 days.

(21) Appl. No.: 15/999,294

(22) PCT Filed: Feb. 16, 2017

(86) PCT No.: PCT/IB2017/050864
§ 371 (c)(1),
(2) Date: Aug. 17, 2018

(87) PCT Pub. No.: WO2017/141180
PCT Pub. Date: Aug. 24, 2017

(65) Prior Publication Data
US 2019/0104723 A1 Apr. 11, 2019

(30) Foreign Application Priority Data

Feb. 18, 2016 (IT) .................. 102016000016781

(51) Int. Cl.
*A01M 17/00* (2006.01)
*A01M 19/00* (2006.01)
(Continued)

(52) U.S. Cl.
CPC ............. *A01M 17/00* (2013.01); *A01B 47/00* (2013.01); *A01G 11/00* (2013.01); *A01M 19/00* (2013.01)

(58) Field of Classification Search
CPC ...... A01G 11/00; A01B 47/00; A01M 21/046; A01M 19/00
See application file for complete search history.

(56) References Cited

U.S. PATENT DOCUMENTS 2,687,597 A 8/1954 Rainey
5,287,818 A * 2/1994 Rajamannan ........ A01B 15/025
111/118

(Continued)

FOREIGN PATENT DOCUMENTS

DE 2306061 A1 8/1973
NL 2001588 C1 11/2009

OTHER PUBLICATIONS

GeneratorGrader, How does a portable Generator work, 2014 (Year: 2014).*

(Continued)

*Primary Examiner* — Sean E Conley
*Assistant Examiner* — Brendan A Hensel
(74) *Attorney, Agent, or Firm* — Workman Nydegger

(57) ABSTRACT

System for the disinfection of agricultural soil includes an electric energy source, at least one radiofrequency or microwave generator connected to the electric energy source and arranged to convert the electric energy into electromagnetic power and a plow-like electromagnetic applicator connected to the radiofrequency or microwave generator via waveguiding lines, the plow-like electromagnetic applicator being arranged to be inserted into the soil so as to transmit the electromagnetic power to the soil, thus obtaining a disinfection of the soil.

9 Claims, 2 Drawing Sheets

(51) Int. Cl.
*A01B 47/00* (2006.01)
*A01G 11/00* (2006.01)

(56) References Cited

U.S. PATENT DOCUMENTS

| | | |
|---|---|---|
| 6,638,475 B1 | 10/2003 | Lagunas-Solar et al. |
| 7,601,936 B2 | 10/2009 | Joines |
| 2010/0322713 A1* | 12/2010 | Hegg .................... A01M 1/226 405/131 |
| 2018/0070556 A1* | 3/2018 | Hagen .................... A01M 19/00 |
| 2018/0132473 A1* | 5/2018 | Diprose ................. G01R 27/18 |

OTHER PUBLICATIONS

International Search Report and Written Opinion dated Jun. 12, 2017, issued in PCT Application PCT/IB2017/050864, filed Feb. 16, 2017.

International Preliminary Report on Patentability dated Aug. 21, 2018, issued in PCT Application PCT/IB2017/050864, filed Feb. 16, 2017.

* cited by examiner

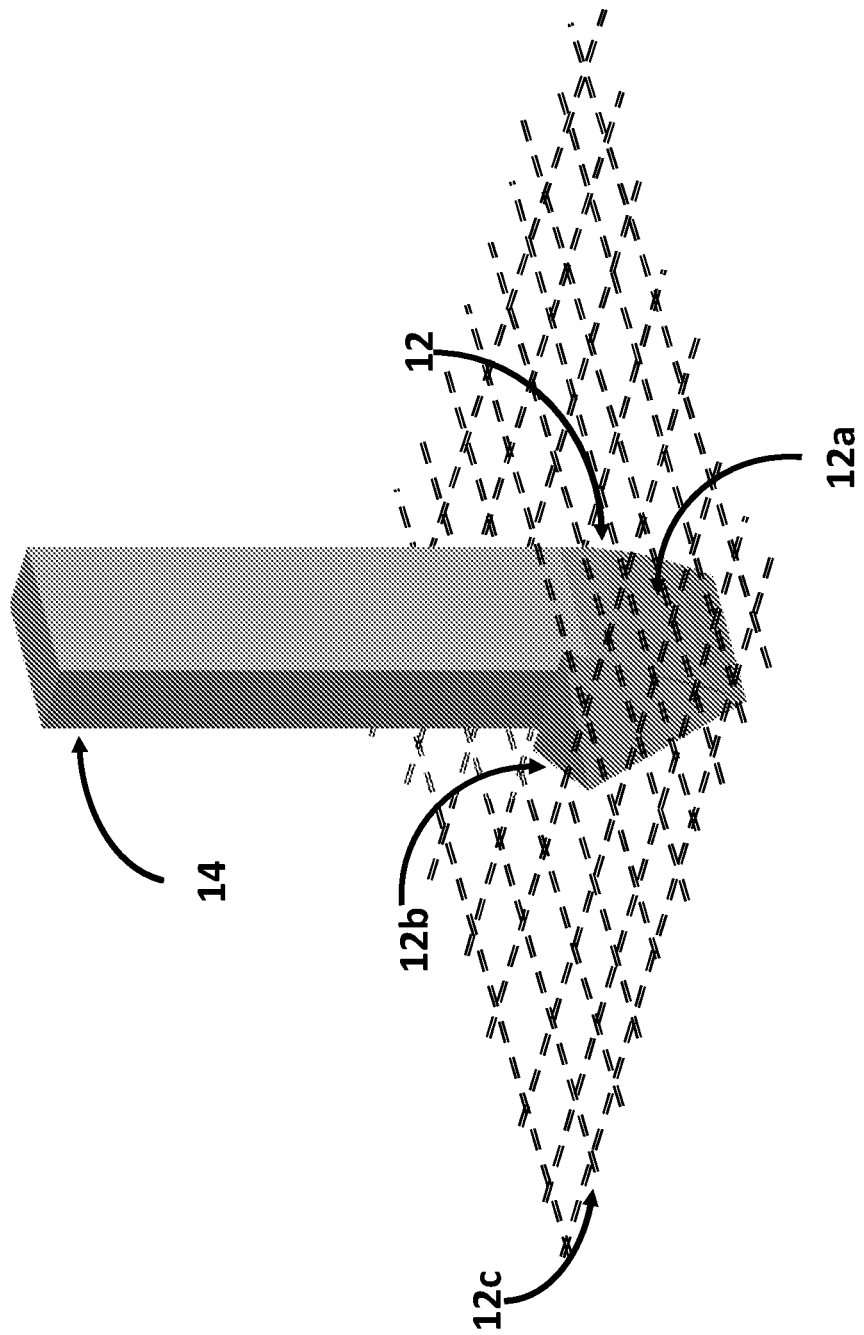

SYSTEM FOR THE DISINFECTION OF AGRICULTURAL SOIL

BACKGROUND OF THE INVENTION

1. The Field of the Invention

The present invention relates to the field of agriculture, in particular to a system for the disinfection of agricultural soil.

2. The Relevant Technology

The technology for the disinfection of agricultural soil with the use of microwaves or radiofrequency is nowadays well known. Microwave and radiofrequency technologies are potentially much more efficient and economical than steam technology, however, practical use of microwaves to date has been hampered by its severe intrinsic limitations due to the difficulty of efficiently coupling energy to the soil and the poor overall energetic efficiency.

Use of electromagnetic energy to kill soil pathogens has been proposed in several documents, for example U.S. Pat. Nos. 5,287,818, 6,638,475, 7,601,936.

The main drawbacks related to the transfer of radiofrequency or microwave energy to the soil (referred here below as "electromagnetic energy") are the difficulty of efficiently coupling electromagnetic energy to the soil and the intrinsic limitation to the energetic efficiency of the generation of radiofrequency or microwave energy.

In many practical instances the energy is transported by an agricultural working or tractor system in the form of fuel, therefore the first conversion performed is the one from chemical (fuel) to electric energy, and this is obtained through the use of a suitable transportable power generator. In this case, a further energy loss occurs, in the form of heat, thus worsening the overall performances of the energy conversion.

The difficulty related to the efficient coupling of the electromagnetic energy to the soil is due to the fact that the electromagnetic energy is generated above the soil surface, on the agricultural moving vehicle or working tool, and is coupled to the soil by means of antennas or similar devices.

Hence, a significant fraction of the electromagnetic energy does not penetrate the soil and, in addition, due to soil losses, the energy coupling decreases with depth.

A solution to this problem was set forth in document U.S. Pat. No. 5,287,818, where it was disclosed to generate microwave energy below the soil surface through suitable "microwave generator units", and the generated energy was coupled to the soil directly by exposure behind "protecting domes". In that document the way of coupling the microwave energy to the soil was not specified.

The above discussed solution has in principle advantages with respect to solutions wherein above-surface energy generation is performed together with the use of electromagnetic energy coupling devices, but it has also, on the other side, several disadvantages.

First of all, the space available to the microwave generator units is significantly limited, thus limiting the available microwave power and the energy efficiency of such generators.

Secondly, the need to protect the sub-surface microwave generators introduces severe limitations to the mechanical structure of the hosting agricultural working tool and to the efficiency in shaping the microwave energy coupling to the soil.

Therefore, there is the need to have an innovative system for performing a disinfection of an agricultural soil which allows to efficiently coupling the energy to the soil, which can be easily used together with standard agricultural tools and which can perform an accurate disinfection of the soil with high overall energy efficiency.

BRIEF SUMMARY OF THE INVENTION

Embodiments of the present invention relate to a system for the disinfection of agricultural soil which overcomes the disadvantages of the prior art.

In one embodiment the system for the disinfection of agricultural soil comprises an electric energy source, at least one radiofrequency or microwave generator connected to the electric energy source and arranged to convert the electric energy into electromagnetic power, a plow-like electromagnetic applicator connected to the radiofrequency or microwave generator via wave-guiding lines, wherein the plow-like electromagnetic applicator is arranged to be inserted into the soil so as to transmit the electromagnetic power to the soil, thus obtaining a disinfection of the soil.

In another embodiment, the electric energy source comprises a fuel tank and an electrical generator connected to the fuel tank and arranged to generate electrical power by using the fuel contained in the fuel tank.

In another embodiment, the electric energy source comprises an electricity network.

In another embodiment, the wave-guiding lines are metal hollow or coaxial waveguides.

In another embodiment, the system further comprises a plurality of radiofrequency or microwave generators and a plurality of plow-like electromagnetic applicators, wherein each plow-like electromagnetic applicator is associated to a respective radiofrequency or microwave generator.

In another embodiment, the system further comprises a plurality of plow-like electromagnetic applicators connected to the at least one radiofrequency or microwave generator.

In another embodiment, the system further comprises a cooling systems arranged to recover heat produced by the at least one radiofrequency or microwave generator during the generation of electromagnetic power, a steam generator connected to the cooling system and arranged to generate steam, at least one pipe connected to the steam generator and arranged to be inserted into the soil so as to allow the steam to be transferred from the steam generator into the soil.

In another embodiment, a further tank is used to provide fuel for the stem generation.

In another embodiment, the plow-like electromagnetic applicator comprises dielectric walls arranged to maximize the electromagnetic power transmission into the soil and minimize electromagnetic power backward reflection and a chisel arranged to facilitate the penetration of the plow-like electromagnetic applicator into the soil.

In another embodiment, the system further comprises a flexible wire mesh arranged to be positioned on a soil surface and be attached to the wave-guiding lines so as to act as a shield to prevent leakage of the electromagnetic power outside the soil.

BRIEF DESCRIPTION OF THE DRAWINGS

Other characteristic, objectives and advantages of the invention will become apparent from the following description, which is purely illustrative and non-limiting, and is to be read with reference to the figures, in which:

FIG. 2 is a schematic representation of the electromagnetic plow-like applicator of the system of FIG. 1.

DETAILED DESCRIPTION OF THE INVENTION

Figure 1:
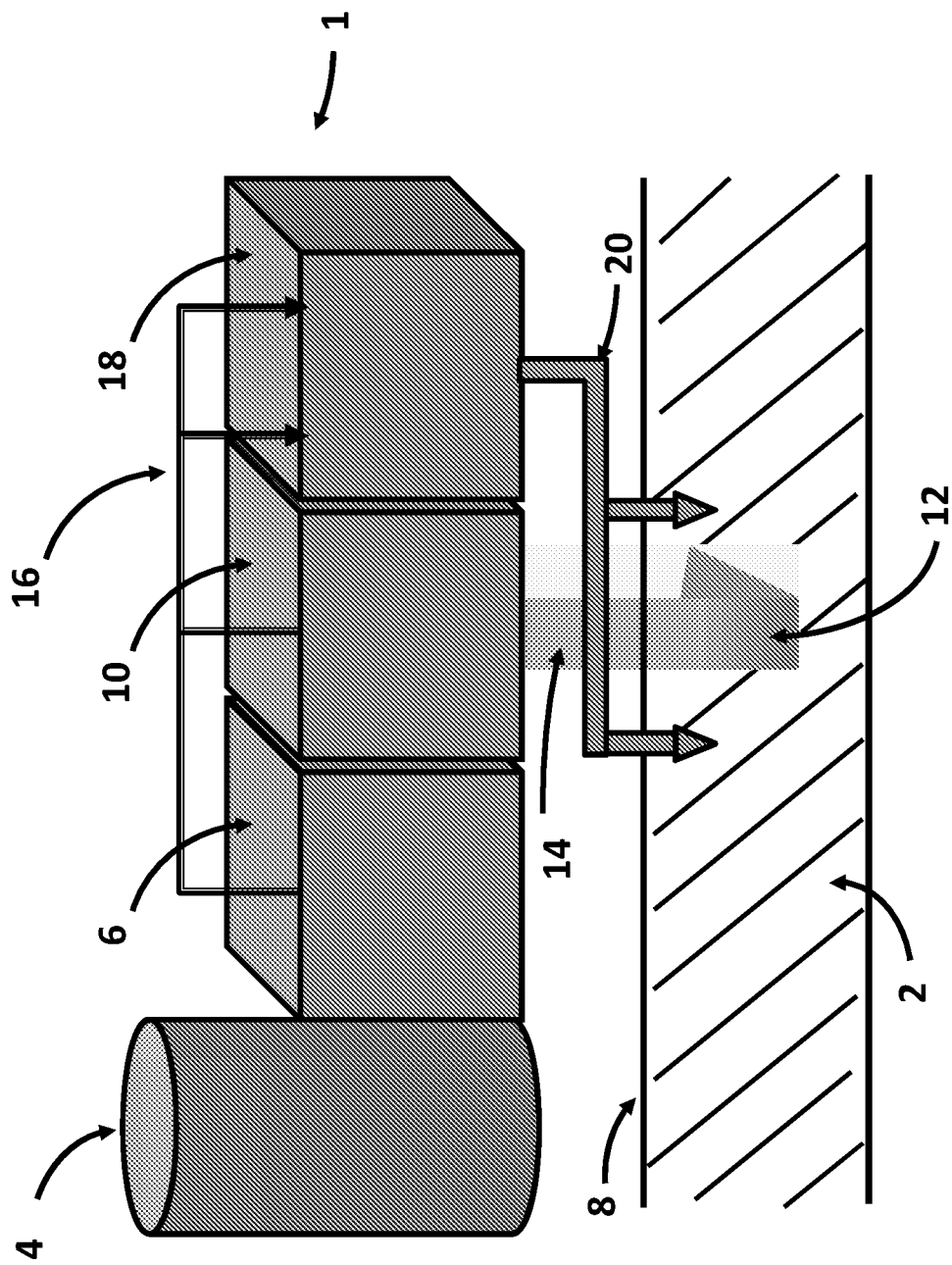
FIG. 1 is a schematic representation of a system for the disinfection of agricultural soil according to the present invention.

Briefly, the system of the present invention addresses the above-mentioned limitation of current art by performing an electromagnetic coupling to the soil through the generation of electromagnetic energy above the soil surface with conventional radiofrequency or microwave generators.

This allows to obtain a high energetic efficiency, low costs, and the possibility to efficiently re-use the energy losses by converting them into heat. The electromagnetic energy is guided to sub-surface applicators by low-loss and high-power access wave-guiding lines.

The electromagnetic energy is efficiently coupled to the surrounding soil thanks to the shape of the dielectric walls of the applicator and the metal-to-dielectric transition. This allows a very low back-reflection of electromagnetic energy towards the generator. In addition, the means of coupling the electromagnetic energy to the soil allow to employ frequencies below the microwave range, thus exploiting ISM (Industrial Scientific and Medical) bands down to 400 MHz.

A flexible wire mesh, mechanically connected to the metal walls of the access line and resting on the surface of the soil prevents leakage of the electromagnetic power in the surroundings, protecting human operators and allowing compliance with electromagnetic field exposure and/or emission regulations.

Preferably, the wire mesh is also electrically connected to the metal walls of the access line.

In addition to the above, it is also possible to recover the energy losses during all steps of conversion from chemical energy to electrical power (where present) and from electrical (DC or AC) power to radiofrequency or microwave power.

This is achieved by observing that the energy loss is in the form of heat, and this invention proposes to use this heat to sustain, or complement, the steam generation. The obtained steam is thus injected into the soil with any of the known systems, thus achieving a co-generation hybrid scheme.

A first part of this invention refers to a specialized plow-like electromagnetic applicator that is inserted into the soil, able to circumvent the shortcomings of all approaches proposed so far.

A second part of the invention is a hybrid energy-efficient system in which steam is used alongside electromagnetic energy in disinfection of soil.

Steam is generated, totally or partially, by recovering the energy lost in converting the initial energy supply (fuel, or AC or DC electric energy) into electromagnetic energy (at radiofrequency or microwave frequencies).

This enhanced use of the energy lost to heat increases the energy efficiency and the disinfection capacity of the overall system. It also impacts on the pathology scene with a combined use of steam and microwaves thus acting on different soils and pathogens.

FIG. 1 shows a system 1 for the disinfection of an agricultural soil 2 according to a preferred embodiment of the present invention. The system 1 comprises a fuel tank 4 and an electrical generator 6 of known type. The electrical generator 6 generates electrical power by using the fuel contained in the fuel tank 4. The electric generator 6 is connected to at least one radiofrequency or microwave generator 10 so that the electric energy produced by the electric generator 6 is converted into electromagnetic power by the radiofrequency or microwave generator 10. The electromagnetic energy is subsequently sent towards the soil 2 as herebelow disclosed in detail.

Alternatively, the electromagnetic power is generated starting from electricity provided by an electric network or by any other known electric energy source.

The electromagnetic energy is then transferred to a sub-surface plow-like electromagnetic applicator 12 via low-loss, high-power wave-guiding lines 14, and used as primary source of soil disinfection.

In fact, the plow-like electromagnetic applicator 12 is arranged to be inserted into the soil 2 so as to transmit electromagnetic power to the soil 2 itself.

In a preferred embodiment, the access wave-guiding lines 14 are metal hollow or coaxial waveguides.

Alternatively, when more than one radiofrequency or microwave generator 10 is present, a respective applicator 12 is associated to each radiofrequency or microwave generator 10.

Alternatively, multiple electromagnetic applicators 12 are connected to each electromagnetic generator 10.

The electromagnetic energy generation above-surface has manifold advantages: it allows a higher energetic efficiency, lower costs, and the possibility to efficiently re-use energy losses into heat. Furthermore, the use of electromagnetic energy allows having a complete control on the power pumped into the soil 2, which means to be selective towards the temperature to be reached and the target pathogens.

In a preferred embodiment of the invention, the heat produced in the generation of electrical and electromagnetic power (through the electrical generator 6 and the electromagnetic generator 10) is recovered by a cooling systems per se known and not shown in the figure (see the arrow 16 indicating that heat is taken from the electric and electromagnetic generators 6 and 10 and sent to a steam generator 18) to generate steam, either alone or in association with heat provided by the fuel contained in the tank 4.

Alternatively, a further tank is used to provide fuel for the stem generation.

The steam is generated in the steam generator 18 and is pumped through at least one pipe 20 into the soil 2 as a second source of soil disinfection. The pipe 20 is in fact inserted into the soil to allow the steam to be transferred from the steam generator 18 into the soil 2.

The scheme thus results in a co-generation hybrid scheme, in which the energy loss associated to electric and electromagnetic energy generation is employed in soil disinfection via steam.

Alternatively, the steam generation is not present.

FIG. 2 shows the plow-like electromagnetic applicator 12 which overcomes the electromagnetic discontinuity problems between air and soil previously described.

The applicator 12 provides a smooth transition between the line 14 and the soil 2 in order to maximize the electromagnetic power transmission into the soil 2 and minimizing electromagnetic power backward reflection.

The applicator 12 comprises dielectric walls 12a (e.g., of plastic or ceramic materials) and is mechanically robust enough to withstand traction into the soil 2 in a fashion similar to a standard plow.

A dielectric chisel 12b is used to facilitate the penetration of the applicator 12 into the soil 2 and traction of the applicator 12 by a tractor or similar suitable agricultural equipment.

In an alternative embodiment, the chisel 12 is completely made of metal.

In an alternative embodiment, the chisel 12 partially comprises metal.

Finally a flexible wire mesh (or a chain-mesh) 12c is positioned on the soil surface 8 and attached to the metal walls of the access line 14, acting as a shield to prevent leakage of the electromagnetic power in the surroundings, protecting possible human operators and allowing compliance with electromagnetic field exposure and/or emission regulations. Preferably, the mesh 12c is arranged to remain on the soil surface 8 in contact with said soil surface 8.

The written description uses examples to disclose the various embodiments, including the best mode, and also to enable any person skilled in the art to practice the embodiments, including making and using any devices or system and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements within insubstantial differences from the literal languages of the claims.

The invention claimed is:

1. A system for the disinfection of agricultural soil comprising:
   an electric energy source;
   at least one radiofrequency or microwave generator connected to the electric energy source and arranged to convert the electric energy into electromagnetic power;
   a plow shaped electromagnetic applicator connected to the at least one radiofrequency or microwave generator via wave-guiding lines, said plow shaped electromagnetic applicator being arranged to be inserted into the agricultural soil so as to transmit the electromagnetic power to the agricultural soil, thus obtaining a disinfection of the agricultural soil;
   a cooling system arranged to recover heat produced by the at least one radiofrequency or microwave generator during the generation of electromagnetic power;
   a steam generator connected to the cooling system and arranged to generate steam;
   at least one pipe connected to the steam generator and arranged to be inserted into the agricultural soil so as to allow the steam to be transferred from the steam generator into the agricultural soil.

2. The system according to claim 1, wherein the electric energy source comprises a fuel tank and an electrical generator connected to the fuel tank and arranged to generate electrical power by using the fuel contained in the fuel tank.

3. The system of claim 1, wherein the electric energy source comprises an electricity network.

4. The system of claim 1, wherein the wave-guiding lines are metal hollow or coaxial waveguides.

5. The system according to claim 1, further comprising a plurality of radiofrequency or microwave generators and a plurality of plow shaped electromagnetic applicators, each plow shaped electromagnetic applicator being associated to a respective radiofrequency or microwave generator.

6. The system according to claim 1, further comprising a plurality of plow shaped electromagnetic applicators connected to the at least one radiofrequency or microwave generator.

7. The system of claim 1, wherein a further tank is used to provide fuel for the steam generation.

8. The system of claim 1, wherein the plow shaped electromagnetic applicator comprises:
   dielectric walls arranged to maximize the electromagnetic power transmission into the agricultural soil and minimize electromagnetic power backward reflection;
   a chisel arranged to facilitate the penetration of the plow shaped electromagnetic applicator into the agricultural soil.

9. The system of claim 1, further comprising a flexible wire mesh arranged to be positioned on a surface of the agricultural soil and be attached to the wave-guiding lines so as to act as a shield to prevent leakage of the electromagnetic power outside the agricultural soil.

* * * * *